United States Patent [19]

Schwartz

[11] Patent Number: 5,262,104
[45] Date of Patent: Nov. 16, 1993

[54] MANUFACTURE OF IMPROVED PYROLYTIC CARBON STRUCTURES

[75] Inventor: Alan S. Schwartz, Austin, Tex.

[73] Assignee: Carbon Implants, Inc., Austin, Tex.

[21] Appl. No.: 935,517

[22] Filed: Aug. 25, 1992

[51] Int. Cl.$^5$ .................... F27B 9/14; C04B 41/85
[52] U.S. Cl. .......................... 264/81; 264/85;
264/162; 264/235; 264/317; 264/346;
264/DIG. 51; 422/139; 427/213; 427/249
[58] Field of Search ............ 264/85, 235, 346, 29.7,
264/81, 162, 154, 313, DIG. 51, 317; 427/213,
249; 422/139

[56] References Cited

U.S. PATENT DOCUMENTS

| | | | |
|---|---|---|---|
| 2,817,605 | 12/1957 | Sanz et al. | 427/249 |
| 3,061,941 | 11/1962 | Goy et al. | 264/346 |
| 3,351,690 | 11/1967 | Stover | 264/235 |
| 4,259,278 | 3/1981 | Flegel et al. | 264/235 |
| 4,276,658 | 7/1981 | Hanson et al. | 3/1.5 |
| 4,546,012 | 10/1985 | Brooks | 427/213 |

FOREIGN PATENT DOCUMENTS

| | | | |
|---|---|---|---|
| 0055406 | 3/1985 | European Pat. Off. | |
| 2569260 | 2/1986 | France | 264/235 |
| 580202 | 11/1977 | U.S.S.R. | 264/235 |

*Primary Examiner*—Jeffery Thurlow
*Assistant Examiner*—Mathieu Vargot
*Attorney, Agent, or Firm*—Fitch, Even, Tabin & Flannery

[57] ABSTRACT

Pyrolytic carbon products are manufactured so as to have improved structural properties. Pyrolytic carbon is deposited on a substrate in a fluidized bed of small particles at a temperature of about 1200° to about 1400° C., and after cooling to ambient temperature, the pyrolytic carbon is machined to desired physical dimensions for a heart valve component or the like. By heating such pyrolytic carbon structures in an inert gas atmosphere to a temperature in the range of about 1000°-1500° C. for at least about one hour following machining, it is found that stresses created in the pyrolytic carbon as a result of the machining are relieved without adverse effect to mechanical properties of the pyrocarbon, resulting in components having greater structural integrity.

17 Claims, 2 Drawing Sheets

MANUFACTURE OF IMPROVED PYROLYTIC CARBON STRUCTURES

The present invention relates to pyrolytic carbon, and more particularly, to methods for relieving stresses in pyrolytic carbon structures formed by high temperature decomposition of carbonaceous gas in a fluidized particle bed.

BACKGROUND OF THE INVENTION

Pyrolytic carbon, also called pyrocarbon, is a strong, heat-resistant form of carbon obtained as a product of hydrocarbon pyrolysis. Heart valve prostheses, blood pumps, and other biomedical systems commonly include components consisting of or coated with pyrolytic carbon because it is thromboresistant, as well as strong. Pyrolytic carbon is usually formed by deposition onto an object or substrate by thermally decomposing gaseous hydrocarbons or other carbonaceous substances in vaporous form in the presence of the object.

An apparatus for coating objects with pyrolytic carbon is described in U.S. Pat. No. 4,546,012, the disclosure of which is incorporated herein by reference. Such apparatus generally includes a tubular chamber having a conically shaped lower end through which an upwardly flowing gas stream comprising a mixture of inert gas and gaseous hydrocarbons is admitted through an inlet port at the apex of the cone. Submillimeter particles partially fill a lower portion of the chamber and form a fluidized bed as the upwardly flowing gas stream causes the particles to travel upwardly in the central region of the chamber and then downwardly along the outer perimeter of the chamber. Objects to be coated are immersed in the bed of particles and are levitated along with them while being exposed to the gas stream.

The tubular chamber is heated to about 1300°-2000° C. so that the gaseous hydrocarbons decompose as they permeate through the fluidized particle bed and deposit carbon on the objects to be coated, as well as on the particles. The upper end of the chamber opposite the conical lower end includes an outlet port through which the inert gas and decomposed gaseous hydrocarbons are withdrawn.

Components coated with pyrolytic carbon commonly require machining in order to conform such components to prescribed dimensions. For example, prosthetic heart valves of the type described in U.S. Pat. Nos. 4,254,508, 4,276,658, and 4,328,592 generally include valve bodies, sometimes referred to as orifice rings, which are typically formed of materials, such as pyrocarbon or pyrocarbon-coated graphite. The valve bodies are typically designed to be deformed sufficiently to provide clearance to insert occluders or leaflets which will open and close in response to hydrodynamic pressure and allow blood to flow in only one direction through the valve. After insertion of the leaflets, the valve bodies are allowed to return to an unstressed, annular configuration.

However, it is desirable to provide structure for increasing the stiffness of the orifice ring after the leaflets are installed which permits thinner valve bodies to be used. Such structure is commonly provided by a metal stiffener ring generally held within a shallow annular groove formed in the outer circumferential surface of the orifice ring by an interference fit. The combination of the stiffener ring and the orifice ring provides an assembly having much greater stiffness and resistance to deformation than the orifice ring alone.

The annular groove is formed initially in the substrate but the surface of the pyrolytic carbon coating of the orifice ring is thereafter ground to precise dimension. There is also finish grinding required generally throughout the pivot regions and at the sealing surfaces. Moreover, in making an all-pyrocarbon valve component, there is initial machining after formation, followed by finish grinding after the substrate has been abraded and/or ground away, as generally described in European Patent 0 055 406B. Many valve bodies undergo controlled warpage during coating, and they may require additional grinding to meet tolerances. Following such grinding operations, failures often occur when installing leaflets because the pyrolytic carbon structures are destroyed or rendered unusable by cracking. Moreover, they are susceptible to the formation of microcracks which do not result in immediate destruction but which may worsen and possibly shorten valve lifetime. These components are expensive to manufacture, and failures and reject rates of even a few percent is troublesome and uneconomical. Because of the many critical life-sustaining applications where pyrolytic carbon is used, a decrease in the failure or rejection rate would not only reduce manufacturing costs, but would increase confidence in the integrity of such components.

A present technique for overcoming warpage of pyrolytic carbon is to design the substrates to be coated with built-in distortion which ultimately results in a pyrolytic carbon-coated component of the desired dimensional configuration following coating. However, intentionally designing distortion into a component may further amplify the problem of cracking.

It is now felt that breakage of a pyrolytic carbon structure upon deformation to install leaflets after being machined results from the redistribution and concentration of stresses in the material. When material is removed from the pyrocarbon structure, localized stresses may be created within the pyrolytic carbon which thereafter result in cracking when the valve body is significantly deformed to install the leaflets. The limiting factor for brittle materials such as these is the maximum tensile stress, which for pyrocarbon having about 7 weight percent silicon doping is about 40-50 thousand psi.

Clearly there is a need for a method which eliminates or reduces cracking of pyrolytic carbon structures when deformed after their being machined, and research to discover such a method has continued.

SUMMARY OF THE INVENTION

The present invention provides a method for manufacturing a pyrolytic carbon product having improved structural properties by depositing pyrolytic carbon upon a substrate in a fluidized bed of small particles at a temperature in the range of about 1200° to about 1400° C., cooling the pyrolytic carbon-coated structure to ambient temperature, then removing portions of the pyrolytic carbon coating as by machining to provide the structure with its desired physical dimensions, and thereafter heating the machined pyrocarbon structure in an inert gas atmosphere to a temperature in the range of about 1000° to about 1500° C. for at least about one hour, whereby stresses in the pyrocarbon are relieved and subsequent cracking is averted.

An important advantage of the method of the present invention is that pyrolytic carbon structures and coated substrates can be manufactured which are less susceptible to fracture or cracking. A further advantage of the invention is that it provides a method for improving the overall manufacturing yield of components embodying pyrolytic carbon for prosthetic devices.

A pyrocarbon object will fail when the amount of applied stress and the amount of residual stress in the object reach a value that equals or exceeds the strength of the object. By greatly reducing the residual stress in a pyrocarbon object, the risk of failure is significantly reduced.

DESCRIPTION OF THE PREFERRED EMBODIMENTS

The following description includes the best mode presently contemplated for practicing the invention. This description is not to be taken in a limiting sense, but is made for the purpose of describing the general principles of the invention.

The present invention provides a method for substantially reducing or eliminating stresses in pyrolytic carbon structures following machining or the like, which stresses would otherwise contribute to failure of many of such structures. As earlier indicated, the pyrolytic carbon of particular interest is formed by the thermal decomposition of gaseous carbonaceous substances in a fluidized particle bed.

Figure 1:
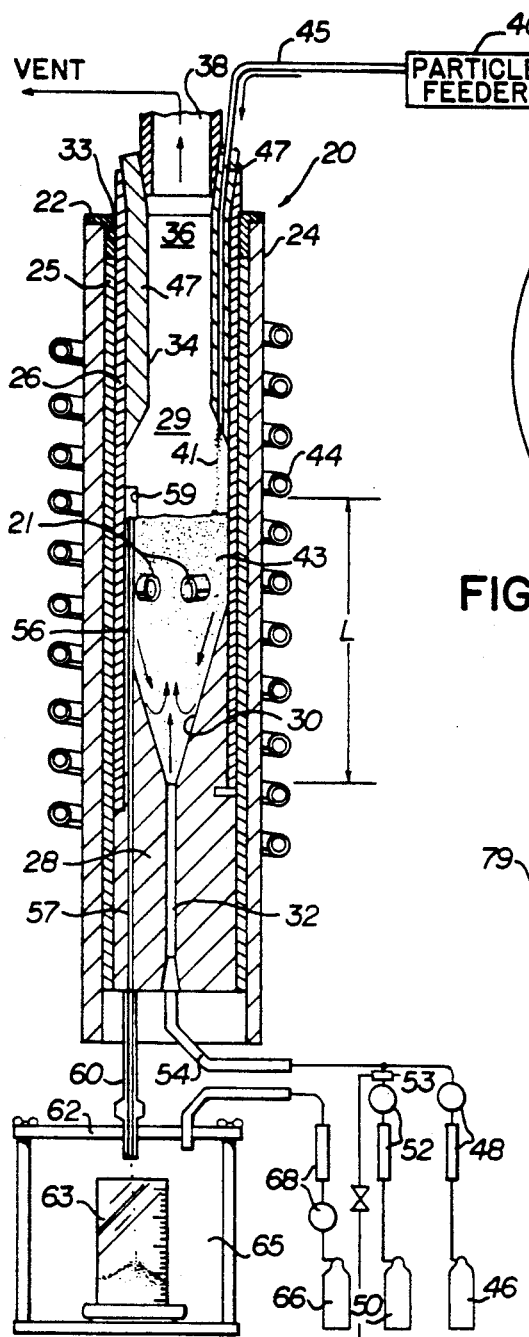
FIG. 1 is an elevational, partly sectional and schematic view of a fluidized bed apparatus in which pyrolytic carbon is formed on an object.

A fluidized bed apparatus 20 in which pyrolytic carbon coatings may be formed upon objects 21 is shown in FIG. 1. The fluidized bed apparatus 20 includes a furnace 22 having a tubular outer furnace shell 24 which is lined with a layer of insulation 25 within which a tubular receptor 26 is supported. The interior of the tube 26 defines a coating chamber 29, and an insert 28, mounted within the lower end of the tube 26, provides a conically shaped surface 30 at the bottom of the coating chamber 29. A central passageway 32 extends vertically upward through the insert 28, in coaxial alignment with the longitudinal axis of the tube 26. A stream of coating and fluidizing gases, described in greater detail hereinafter, is supplied to the coating chamber 29 through the passageway 32.

A removable closure 34 is fitted within the upper end of the tube 26, which closure 34 includes a central exit passageway 36 through which exhaust gases are removed from the furnace chamber 29. The passageway 36 is connected in fluid communication with an exit conduit 38 through which the gases are routed for subsequent treatment, if desired, before discharge to the atmosphere or reprocessing.

A particle feeder 40, located above the chamber 29 and external to the furnace 22, supplies small particles 41 through a particle feed tube 45 and a duct 47 (which passes through the closure 34) to facilitate the formation and maintenance of a particle bed 43 in the chamber 29. The particle bed 29 is fluidized when the fluidizing atmosphere is flowed upwardly through the passageway 32 and levitates the small particles. Examples of particle feeders which may be implemented in the present invention are described in U.S. patent application Ser. No. 07/821,472, "Particle Feeding Device And Method For Pyrolytic Carbon Coaters," filed Jan. 14, 1992, and U.S. Pat. No. 4,594,270, "Bed Sampler For A High-Temperature Fluidized Bed", the disclosures of which are incorporated herein by reference. The particles 41 provided by the particle feeder 40 fall by gravity through the duct 42 and become part of the particle bed 43 in the chamber 29.

An electric heating coil 44 heats the tubular receptor 26 and fluidized particle bed 43 comprising the active deposition region of the furnace 22. The particle bed 43 may be heated within the range of about 1200° to 2000° C., but is preferably heated to between about 1200° C. and about 1400° C., and more preferably to about 1350° C.

The fluidized bed coating apparatus 20 is generally operated as a "steady-state-bed". Individual particles 41 of the particle bed 43 are levitated in the central region by the gas stream fed through the central passageway 32 from the inverted apex of the conical surface 30 of the insert 28. The gas stream typically consists of a mixture of an inert fluidizing gas plus a carbonaceous substance, such as a gaseous hydrocarbon, as for example, methane, ethane, propane, butane, acetylene, propylene, or some other carbon-containing substance that is gaseous or which may easily be vaporized, or a combination of two such hydrocarbons. For components for prosthetic devices, isotropic pyrocarbon is preferably deposited, i.e. pyrocarbon having a Bacon Anisotropy Factor (BAF) of not more than about 1.3, which therefore has very little preferred orientation.

In FIG. 1, a source 46 of hydrocarbon gas is illustrated which is equipped with a flow-regulating valve arrangement 48. Also illustrated is a source 50 of inert gas, for example, helium, argon or nitrogen, which is likewise equipped with a suitable flow-regulating valve arrangement 52. The inert gas stream may be routed to flow through a mixing valve 53 or chamber where an alloying component is added, such as methyltrichlorosilane, so the resultant pyrolytic carbon coating includes a minor amount of alloying silicon carbide, as is well known in this art. When the term pyrolytic carbon is used herein, it should be understood to include pyrolytic carbon having a minor amount of silicon carbide (e.g. about 6 to 8 weight percent) or the like alloyed therewith. The density of such lightly SiC-doped pyrocarbon is usually between about 1.9 and about 2.2 gm/cm$^3$. The gas sources flow into a common line 54 connected to the vertical passageway 32 in the insert 28.

The upward flow of gas through the fluidized bed apparatus 20 is regulated so that the fluidized bed 43 occupies the lower region of the chamber 29 of the tube 26 as depicted in FIG. 1. The flow of the gaseous atmosphere through the central passageway 32 causes a generally toroidal flow pattern to be established in the fluidized bed region, with the minute particles 41 traveling upwardly in the central portion of the chamber 29 and then downwardly, generally along the outer perimeter of the chamber. When particles having a density of about 3 grams/cm$^3$, for example, are used (i.e., greater than the density of the deposited pyrolytic carbon which is about 2 g/cm$^2$), they will gradually become less dense as they grow in size from being coated. The smaller, more dense particles tend to remain in the lower portion of the bed while the more thickly coated, less dense particles are levitated to the upper portion of the particle bed 43 by the gas stream flowing upward through the duct 32. A preferred material for the particles is zirconium oxide which has a density of about 5.5 grams/cm$^3$.

A tube 56, formed of a refractory material, such as graphite or mullite, is positioned within a vertical passageway 57, extending through the insert 28 and upward through the particle bed 43. A spillover inlet port 59 near the top of the tube 56 establishes a predetermined maximum elevation, "L" of the particle bed 43. When the particle bed 43 reaches this elevation, as a result of the addition of make-up seed particles 41 in concert with the expansion of the particle bed caused by the growing size of the particles in the bed, generally those particles 41 having substantial thicknesses of pyrolytic carbon coating are removed from the chamber 29 through the port 59. An exit conduit 60 coaxially aligned with the tube 56 near the bottom of the insert 28 receives the coated particles that enter and fall through tube 56 and channels them into a collection chamber 62 where they are accumulated in a container 63.

The collection chamber 62 includes glass walls 65 and is preferably pressurized with inert gas from a suitable gas source 66 with the rate of gas flow controlled by a valve arrangement 68. The flow of inert gas through the collection chamber 62 and up through the tube 56 through the exit conduit 60 acts as a purge to prevent substantial quantities of dust from entering the collection chamber 62 and being deposited on the glass walls 65. The inert gas flows at a minimum rate sufficient to prevent substantial quantities of dust from entering the collection chamber 62; however, the flow rate can be adjusted if desired to vary the rate at which pyrolytic coated particles 41 are permitted to be withdrawn down tubes 56 and 60 into the collection chamber.

In the formation of pyrolytic carbon, objects, such as objects 41, which are to be coated with pyrolytic carbon, are manually positioned within the particle bed 43 in the chamber 29. The chamber 29 is brought up to the desired operating temperature with a flow of only inert fluidizing gas. Then, the valves 48 and 53 are opened so that an appropriate mixture of fluidizing and carbonaceous gases is supplied through the passageway 32 to deposit pyrocarbon in the fluidized bed 43. The level of the particle bed 43 rises slowly as the particles 41 in the particle bed 43 grow in size by acquiring pyrolytic carbon coatings due to thermal decomposition of the carbonaceous gases. The particle feeder 40 provides make-up small particles 41 to the fluidized bed 43 to compensate for the particles being withdrawn from the chamber 29 through the inlet port 59 of the tube 56. The addition of make-up particles 41 to the fluidized particle bed 43 maintains the overall surface area of the bed within desired limits of a steady-state bed. The circulation provided by the fluidization causes the less dense larger particles to be levitated higher than the more dense uncoated make-up particles 41 and the particles having only thin coatings, which have a greater tendency to remain near the bottom of the bed.

When the level of particle bed 43 reaches the inlet port 59, particles enter the inlet and fall down tube 56 and conduit 60, and enter chamber 62 where they are collected in chamber 63. The minimum slow purge of inert gas up tube 56 ensures that the major portion of dust generated in chamber 29 is removed through the exit conduit 38 and does not travel with the particles down the tube 56.

After a predetermined time, the formation of a pyrolytic carbon coating having a desired thickness has been accomplished, and the valves 48 and 53 are closed to shut off the supply of coating gases to the chamber 29. The heater 44 is disabled, and the chamber is allowed to cool so that the coated objects 41 may be removed from the furnace 22. After the coated objects 41 reach about ambient temperature, the coated objects are removed.

The objects, such as components for prosthetic devices, e.g. heart valves, having these pyrolytic carbon coatings or the all-pyrocarbon structures (hereinafter collectively referred to as "pyrolytic carbon structures") are suitably machined to appropriate dimensions, as for example by electric discharge machining (EDM) and/or grinding. Such machining of the pyrolytic carbon structures has now been found to introduce stresses that may lead to cracking.

Figure 2:
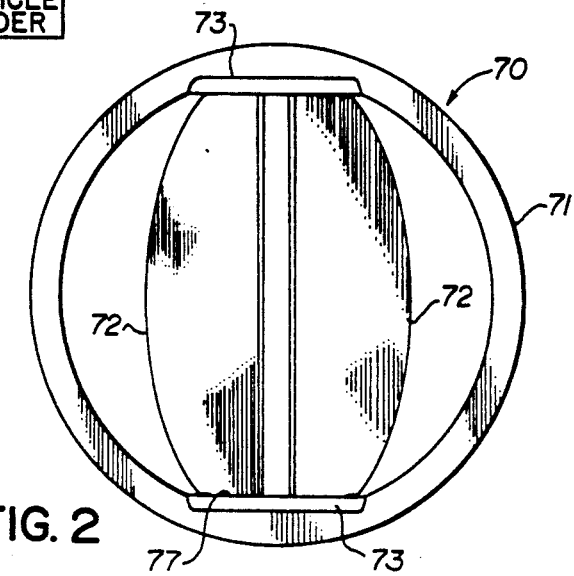
FIG. 2 is a plan view of a bi-leaflet heart valve which has been made with pyrocarbon coated components.
Figure 3:
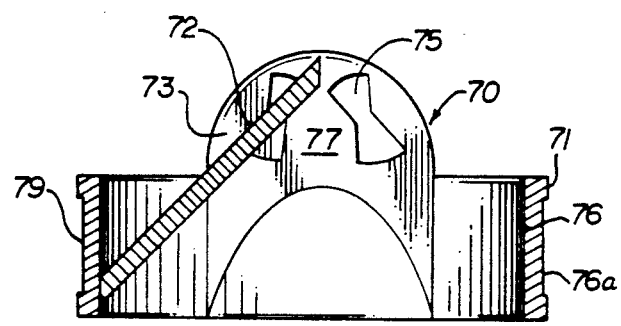
FIG. 3 is a cross sectional view of the heart valve of FIG. 2 which has one leaflet removed.

For example, shown in FIGS. 2 and 3 is a heart valve prosthesis 70 in wide use in the United States that is the subject matter of U.S. Pat. No. 4,276,658, the disclosure of which is incorporated herein by reference. The valve 70 includes a valve body 71 which defines a blood passageway that is alternately opened and closed by movement of a pair of leaflets 72 in response to the flow of blood. The valve body 71 includes two projections 73 having recesses 75 which receive ears carried by the leaflets 72 that mount the leaflets to pivot between the open and closed positions. The valve body and leaflets can be formed from graphite substrates 76 coated with pyrolytic carbon 76a.

These diametrically opposed recesses 75 are provided in each of flat inward-facing walls 77 of the projections 73. The recesses 75 may be formed in the substrate 76 by a cylindrically shaped grinding wheel having an appropriately sized diameter to form the curved recess surfaces. The leaflets 72 also include flat surfaces which abut against the flat walls 77 which serve as bearing surfaces for the pivoting leaflets.

The outer circumferential surface of the valve body 71 is provided with an annular groove 79, in which a suturing ring or stiffening ring may be supported, as is common with valve bodies of this type. If used, a stiffening ring, typically fitted within the groove with an interference fit, provides a composite valve body structure having increased rigidity and stiffness. Such composite assembly permits the use of valve bodies having a thinner wall section, thus providing a passageway which is less restrictive to blood flow than would a valve body having a wider wall section and an otherwise equal outside diameter.

In order to obtain the precise dimensions necessary for the smooth actuation of the leaflets within the valve body, as well as to promote proper sealing between abutting surfaces, it is necessary to perform finish grinding in the regions of the pivot arrangements and sealing surfaces. It is also necessary to remove excess pyrocarbon that deposits along outer edges, a phenomenon sometimes referred to as "dog-boning". Such grinding operations of necessity remove portions of the deposited pyrocarbon and have now been found to result in the creation of stresses in the valve bodies.

The leaflets are installed by deforming the valve body 71 so that the projections 73 move outwardly, away from each other, to permit insertion of the ears of the leaflets 72 into the recesses, and then allowing the valve body and the projections to return to their original undeflected states. During deflection to insert the leaflets, the valve body 71 may crack so substantially as to be destroyed, or it may develop microcracks. Destructive cracking occurs in a small, but significant, number of the pyrolytic carbon structures of such valve bodies while being deformed during installation of the leaflets, causing these components to be rejected.

Such cracking during the installation of occluders is by no means limited to the '658 valve, but tends to be a problem common in the manufacture of heart valve prostheses as for example the heart valves shown in U.S. Pat. Nos. 4,443,894, 4,689,046 and 4,692,165, as well as other products of this type employing pyrolytic carbon structures which are subjected to machining operations. Such other products may include products employing an all pyrolytic carbon structure, the manufacture of which is described in European Patent Specification No. 0 055 406, entitled "Method of Making All-Pyrocarbon Prosthetic Device Components."

In the manufacture of a product having an all-pyrolytic carbon structure, a mandrel substrate made of isotropic artificial graphite, such as that sold under the trade name POCO, is machined to have the mirror image of the desired product. Then the mandrel is coated with isotropic pyrocarbon (pyrolytic carbon) in a fluidized particle bed furnace of the type described in U.S. Pat. No. 4,546,012. Following deposition and cooling, excess pyrolytic carbon which was deposited onto the exposed axially upper and lower surfaces of the mandrel substrate are first removed, as by a rough grinding process, leaving a pyrocarbon deposit which resembles that of the ultimate desired object. Then a major portion of the substrate is removed, by boring, rough grinding or the like; portions of the substrate located reasonably distant from the interface with the pyrolytic carbon deposit can be removed by operations which need not be held to close tolerance. Finally, the remainder of the substrate is removed, eliminated or dissolved using a process that does not chemically or physically affect the pyrocarbon. For example, chemical dissolution of POCO graphite may take place using the mixture of hot silver dichromate and sulfuric acid; alternatively, it can be abraded or sand-blasted away or removed electrolytically in a bath of nitric acid without adversely affecting the pyrolytic carbon.

As in the manufacture of heart valve prostheses of the type described in the '658 patent, a small, but significant number of all pyrocarbon valve bodies manufactured in accordance with the European patent specification, such as those shown in the '894 patent, develop stresses as a result of the separation of the substrate from the pyrolytic carbon structure and the finish grinding operations performed on the pyrocarbon structure, which stresses result in cracking upon deflection to install the leaflets. Because of the critical life-sustaining functions of pyrolytic carbon components of heart valve prostheses, eliminating or mitigating the source of the cracking problem not only reduces manufacturing costs but also greatly increases confidence in the integrity of such components.

Surprisingly, it has been found that heating the pyrolytic carbon structures at about the deposition temperature, after they have been machined, significantly reduces the amount of cracking that later occurs in pyrolytic carbon, particularly in valve bodies when deformed to permit the installation of leaflets. It has now been found that removal of deposited pyrocarbon by machining causes stresses in the pyrolytic carbon to be concentrated and/or created such that the subsequent imposition of momentary stress on a heart valve body during its deformation to install leaflets may cause specific stresses to exceed the stress limitations of the pyrolytic carbon. However, it has now been surprisingly found that reheating to about the deposition temperature for a predetermined length of time causes these stresses to be essentially totally relieved, or at least substantially reduced to an acceptable level, which results in a stable, intact structure having desired physical dimensions. Moreover, reheating in this manner does not degrade the strength, the hardness or the microstructure of the pyrocarbon or adversely affect its elastic modulus.

To effect this stress-relieving treatment, the machined pyrolytic carbon structures may be returned to a fluidized bed furnace and reheated to a temperature of about the original deposition temperature, e.g. about 1350° C., for at least about one hour while being levitated in an inert atmosphere, such as nitrogen, preferably along with an auxiliary bed of small particles. However, any simple inert atmosphere furnace could be used. In some applications, it may be desirable to heat-soak the pyrolytic carbon at this temperature for a period of about 3–4 hours. After being heat-soaked, the pyrolytic carbon structures, e.g. valve bodies, are slowly cooled to ambient as before, and when thereafter they are removed from the furnace, they are in a stress-relieved state. The benefits of reheating the machined pyrolytic carbon structures to reduce residual stresses have been confirmed by the examples which follow. By employing this stress-relieving treatment, fewer valve bodies need to be rejected so that manufacturing costs are reduced; however, strength, hardness and elastic modulus are not reduced nor is the microstructure changed.

EXAMPLE 1

Figure 4:
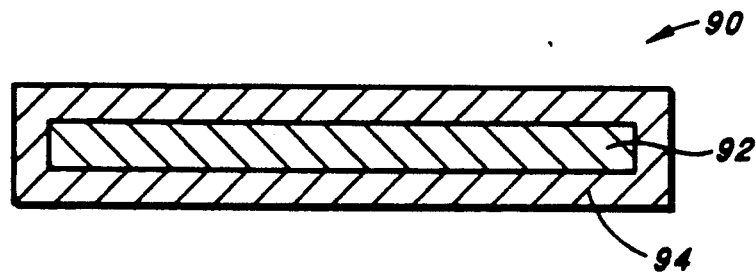
FIG. 4 is a cross-sectional view of a test structure comprising a pyrolytic carbon-coated graphite slab.

A group of 10 graphite slabs having dimensions of 1.082"×0.202"×0.012" were placed in a fluidized bed of particles within an apparatus of the general type of the fluidized bed apparatus 20 having a volume of 14,500 cc. The graphite slabs were heated to a temperature of about 1350° C. while being bathed in a flowing gas stream composed of about 40% propane and about 60% nitrogen with a methyltrichlorosilane feed rate of 6 gm/min. Deposition was carried out for about 4 hours to form pyrolytic carbon coated composite structures 90. FIG. 4 is a cross section view through such a composite structure 90 showing the interior graphite slab 92 and the surrounding pyrolytic carbon coating 94 having a thickness of about 0.012". The silicon content of the pyrolytic carbon coating 94 was 6.6% as measured by averaging a microprobe scan across the thickness of the coating.

Figure 5:
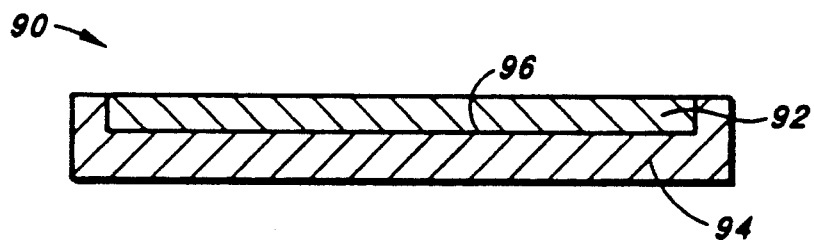
FIG. 5 is a cross-sectional view of the test structure of FIG. 4 after one portion of the pyrolytic carbon coating has been removed.
Figure 6:
FIG. 6 is an elevation view of the remaining pyrolytic carbon coating of FIG. 5 after the graphite slab has been lapped away.

FIG. 5 shows the structure after the pyrolytic carbon coating 94 was lapped off one side of each structure 90 to expose the graphite slab 92, still coated with pyrolytic carbon on the other side. Then, as shown in FIG. 6, for ten samples, the graphite substrate 92 and the peripheral edge regions were lapped away so that all that remained were 10 silicon-doped specimens (specimens 1-10) of pyrolytic carbon 94'.

Upon removal of the graphite substrate, the pyrocarbon specimen which remained assumed a curved condition, with the surface of the pyrolytic carbon coating which had been at the graphite interface 96 of each structure 90 exhibiting a curvature which was convex. The radius of curvature of each of the pyrolytic carbon specimens were measured and found to be about 10". If flat, the specimens would have dimensions of approximately 1.12"×0.18"×0.012." The stress in the pyrolytic carbon coatings remaining after removal of each of the graphite substrates was calculated to be about 3,000 psi, assuming a linear stress distribution.

Each of the specimens 4-10 was loaded into a graphite fixture and subjected to a bending moment resulting in an imposed radius of curvature of about 1.2". This radius of curvature corresponds to a stress level of approximately 15,000-19,000 psi. The specimens 1-3 were also loaded into the test fixture, but they were held in a cavity so that no external force was applied to them.

The test fixture holding the specimens 1-10 was placed in a furnace and heated to 1350° C. for three hours under flowing nitrogen. After the specimens were cooled to ambient, they were removed from the fixture, and their radii of curvature were measured. Specimens 4-10 each had a final radius of curvature of about 1.4", indicating the stress in the restrained specimens had decayed from about 15,000-19,000 psi to about 3,000 psi. Specimens 1-3 showed a decrease in the radius of curvature to about 3.5".

Next, specimens 4-7 were restrained in flat condition by slipping them into a narrow groove which was machined into a graphite block. (A perfectly flat surface has a radius of curvature of infinity.) In this flattened configuration, the maximum stress level in the specimens was about 17,000 psi. These four specimens were again heated in a furnace at 1350° C. for three hours in a flowing nitrogen atmosphere. The specimens 4-7 were allowed to cool, and their radii of curvature were measured again and found to be about 3.2". These radii indicate that the maximum stress level in each of the specimens 4-7, as restrained flat, had been relieved by the heat treatment from about 17,000 psi to about 7,400 psi.

EXAMPLE 2

A batch of graphite rings made from POCO AFX-5Q isotropic graphite having dimensions of about 0.75 OD, 0.015 inch wall thickness, and 0.200 inch height are coated with intermediate density, isotropic pyrocarbon under the same conditions as set forth in Example 1. The resulting coating thickness was about 0.02 inch on the outer diameter (OD) and about 0.01 inch on the interior diameter (ID). The density of the silicon-doped material was about 2.1 grams per cm$^3$, and it had a silicon content of about 5% weight. Ten of the rings were axially cut with a diamond blade sectioning saw. When cut, all ten rings sprang open a distance greater than the width of the saw kerf, indicating that the pyrocarbon coating the outer periphery had a net tensile hoop stress in it.

Each cut ring was paired with an uncut ring and heat-treated in a fluidized bed of particles under a nitrogen atmosphere at a temperature of about 1350° C. These pairs of rings are heat-treated at about 1300° C. for a series of differing times varying from 5 minutes to 180 minutes. In all cases the gap width increased. The increase in gap width shows that some shrinkage occurred as a result of the subsequent heat treatment, and the experimental evidence suggests that structural reorganization of the pyrocarbon was the dominant mechanism for the observed shrinkage.

Following heat treatment, six of the rings from among that set of rings that were previously uncut and heated, while paired with a previously cut ring, were cut open after the heat treatment. Surprisingly, although the length of time of heat treatment varied from 10 to 175 minutes for the six rings that were subsequently cut, all of the rings sprang open essentially the identical amount, which was substantially the same amount as the first ten rings opened when they were initially cut. The results of this testing showed that the heat treatment had substantially no effect upon the net tensile hoop stress in the OD portion of the intact, unaltered pyrocarbon, whereas the heat treatment, at about 1350° C., after the creation of stresses resulting from the removal of portions of the pyrolytic carbon deposit is found to relieve such stresses. The structural strength and the microstructure of the pyrocarbon remain unchanged following this heat treatment. It is now believed that heating of the machined (lapped) pyrolytic carbon specimens caused the pyrolytic carbon to undergo a structural reorganization which resulted in stress relief within the pyrolytic carbon without affecting structural strength and other mechanical properties.

The discovery that pyrolytic carbon having stresses following the removal of a part of that structure by machining could be very substantially reduced in stress by heating only to temperatures as low as about 1350° C. was quite surprising because carbon does not begin to creep until it reaches temperatures of about 1800° C. Creep is an effect which is associated with the slow plastic deformation of metals and other similar materials under constant load, and it occurs at temperatures where the material recrystallizes, causing all strength properties to be reduced. Thus, a process is now available by which stress levels in pyrolytic carbon, which has become highly stressed by machining and/or finishing operations performed after the deposition of the pyrocarbon, can be effectively removed by a stress-relieving heat treatment performed at about the pyrocarbon deposition temperature without accompanying adverse effects.

The pyrocarbons studied as a part of the foregoing examples were deposited under conditions typical of those used for the manufacture of medical prostheses, and therefore this process is considered to be particularly useful for the manufacture of such prostheses having relatively thick pyrocarbon coatings or wherein substantial machining operations are performed that remove a part of the pyrocarbon deposited. It is considered to be particularly advantageous for use in making all pyrocarbon components; however, it is also very valuable in making components from pyrocarbon-coated substrates. More particularly, the process is considered to have potentially important commercial applications where machining and/or finishing operations are carried out during a typical manufacturing process that increase the stresses in the pyrocarbon structures to such a level that such stresses result in excessive breakage during occluder installation or during other testing operations.

In view of the above teachings, it will be appreciated that the several objects of the invention are achieved and other advantageous results attained. As various changes could be made without departing from the scope of the invention, it is intended that the foregoing description shall be interpreted as illustrative and not limiting.

Particular features of the invention are emphasized in the claims that follow.

What is claimed is:

1. A method of manufacturing a pyrolytic carbon structure having improved structural properties, comprising the steps of:

depositing isotropic pyrolytic carbon having very little preferred orientation upon a substrate in a fluidized bed of small particles at a temperature in the range of about 1200° to about 1400° C. to form a pyrolytic carbon structure;

cooling said pyrolytic carbon structure to ambient temperature;

removing portions of said deposited pyrolytic carbon to provide said pyrolytic carbon structure with desired physical dimensions; and heating said pyrolytic carbon structure following said removal to a temperature between about 1000° and about 1500° C. in an inert gas atmosphere for at least about one hour, whereby stresses which are present in said pyrolytic carbon following said removal are relieved.

2. The method of claim 1 wherein said inert gas is selected from the group of helium, argon, and nitrogen.

3. The method of claim 1 wherein said portions of said pyrolytic carbon are removed by machining.

4. The method of claim 1 further including the step of removing said substrate from said pyrolytic carbon structure in order to provide an all-pyrolytic carbon structure.

5. The method of claim 4 wherein the step of removing said substrate includes grinding said substrate away from said pyrolytic carbon structure.

6. The method of claim 4 wherein the step of removing said substrate includes boring said substrate.

7. The method of claim 4 wherein the step of removing said substrate includes dissolving said substrate in a solvent in which said pyrolytic carbon structure is insoluble.

8. A method of manufacturing a heart valve having a pyrolytic carbon valve body that has improved structural properties, comprising the steps of depositing isotropic pyrolytic carbon having very little preferred orientation upon a substrate having the general shape of a tubular valve body while said substrate is being levitated in a fluidized bed of small particles at a temperature in the range of about 1200° to about 1400° C. to form a pyrolytic carbon structure;

cooling said pyrolytic carbon structure to ambient temperature;

removing portions of said deposited pyrolytic carbon from said structure to provide a pyrolytic carbon valve body having desired physical dimensions;

heating said pyrolytic carbon valve body following said removal to a temperature between about 1000° and about 1500° C. in an inert gas atmosphere for at least about one hour, whereby stresses in said pyrolytic carbon are relieved;

applying forces to said tubular valve body to deform it to a shape where its cross section is non-round and installing at least one occluder in said valve body while in said non-round condition; and removing said applied forces so that said tubular valve body returns to a round condition.

9. A method of relieving stress in pyrolytic carbon structures created by depositing isotropic pyrolytic carbon having very little preferred orientation upon a substrate in a fluidized bed of small particles at a temperature in the range of about 1200° to about 1400° C., and following said pyrolytic carbon deposition, changing the physical dimensions of said deposited pyrolytic carbon, which method comprises heating the pyrolytic carbon structure following the change in physical dimensions to a temperature between about 1000° and about 1500° C. in an inert gas atmosphere for at least about one hour, whereby stresses in said pyrolytic carbon are relieved.

10. The method of claim 9 wherein said inert gas is selected from the group of helium, argon and nitrogen.

11. The method of claim 1 wherein only deposited pyrolytic carbon and none of said substrate is removed from said cooled structure.

12. The method of claim 11 wherein said substrate has a complex shape of a component of a heart valve.

13. The method of claim 1 wherein said heating step is carried out while said pyrolytic carbon structure is being levitated within a fluidized bed of small particles.

14. The method of claim 8 wherein said portions of deposited pyrolytic carbon are removed without removing any of said substrate so that said tubular valve body includes said substrate entirely coated with pyrolytic carbon.

15. The method of claim 14 wherein said heating step is carried out while said pyrolytic carbon structure is being levitated within a fluidized bed of small particles.

16. The method of claim 9 wherein said heating step is carried out while said pyrolytic carbon structure is being levitated within a fluidized bed of small particles.

17. The method of claim 9 wherein said portions of deposited pyrolytic carbon are removed without removing any of said substrate so that said tubular valve body comprises said substrate entirely coated with pyrolytic carbon.

* * * * *